June 29, 1926.

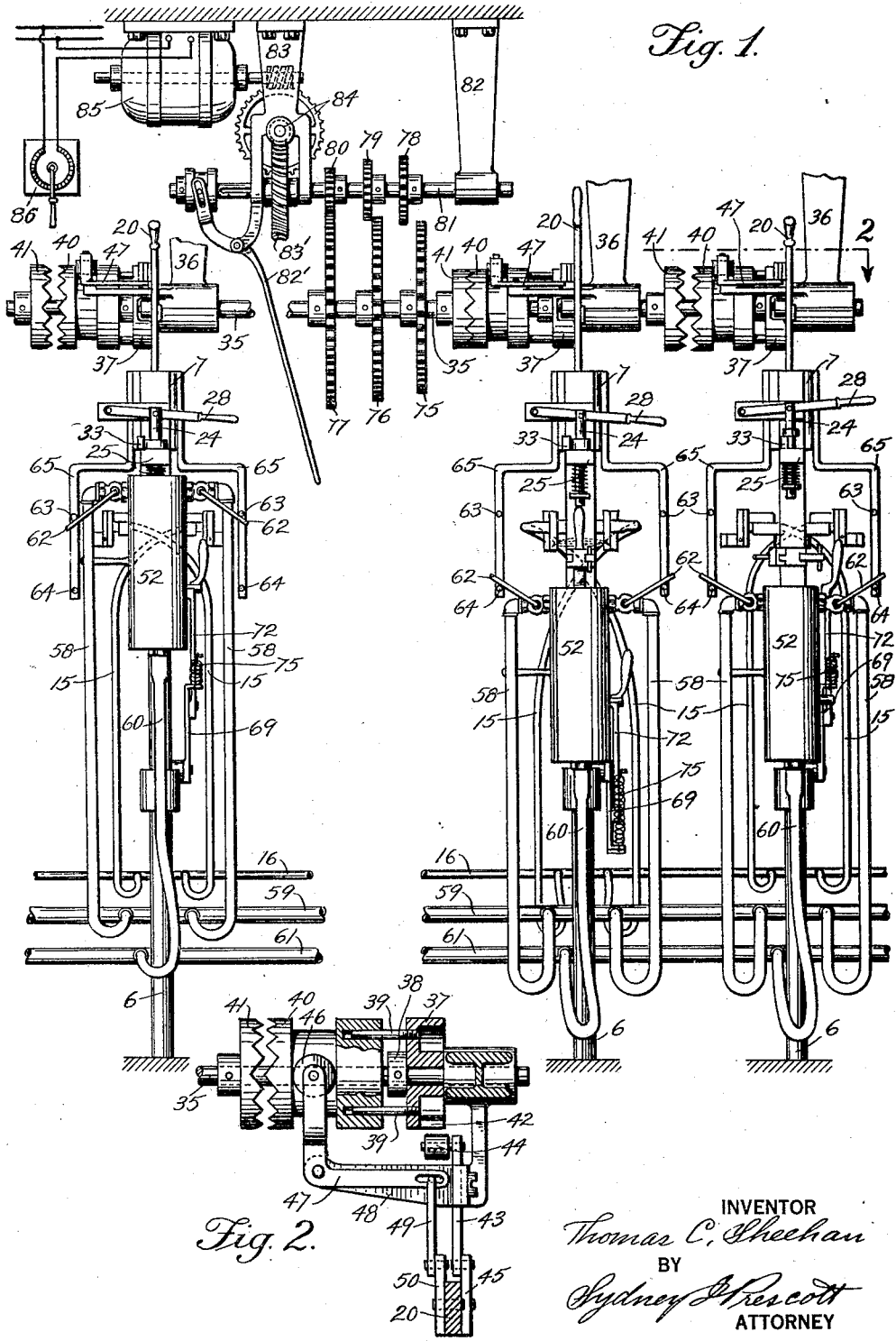

T. C. SHEEHAN

BRAZING MACHINE

Filed April 15, 1925

1,590,210

2 Sheets-Sheet 2

INVENTOR
Thomas C. Sheehan
BY
Sydney W. Prescott
ATTORNEY

Patented June 29, 1926.

1,590,210

UNITED STATES PATENT OFFICE.

THOMAS C. SHEEHAN, OF UPPER MONTCLAIR, NEW JERSEY, ASSIGNOR TO WADE & BUTCHER CORPORATION, A CORPORATION OF NEW JERSEY.

BRAZING MACHINE.

Application filed April 15, 1925. Serial No. 23,435.

This invention resides in a brazing machine, particularly for brazing knife blades and handles. Its main object is the production of a machine in which the brazing operation is automatically terminated after a predetermined heating interval, in order that uniform results in successive operations will be insured. Another object of the invention is the production of such a machine in which the brazed assemblages of parts will be automatically and uniformly cooled. Still another object of the invention is the production of such a machine having a plurality of like brazing units, in order that one operator can successively feed parts to be brazed to the several units, and take the finished product therefrom, while the brazing operation is going on in other units, thus greatly increasing production, and greatly decreasing cost, over the methods heretofore employed in such work. With these and other objects not specifically mentioned in view, the invention consists in certain constructions and combinations which will be hereinafter fully described and then specifically set forth in the claims hereunto appended.

Figure 3:
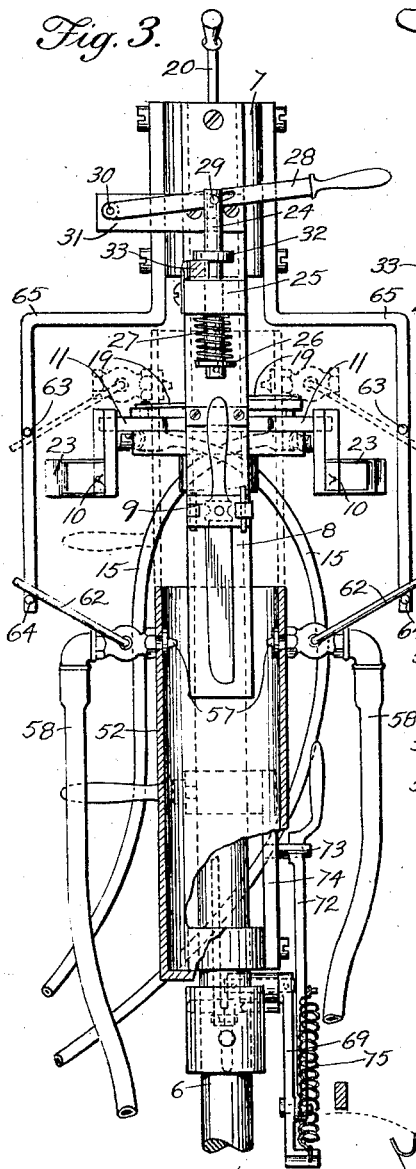
Figure 4:
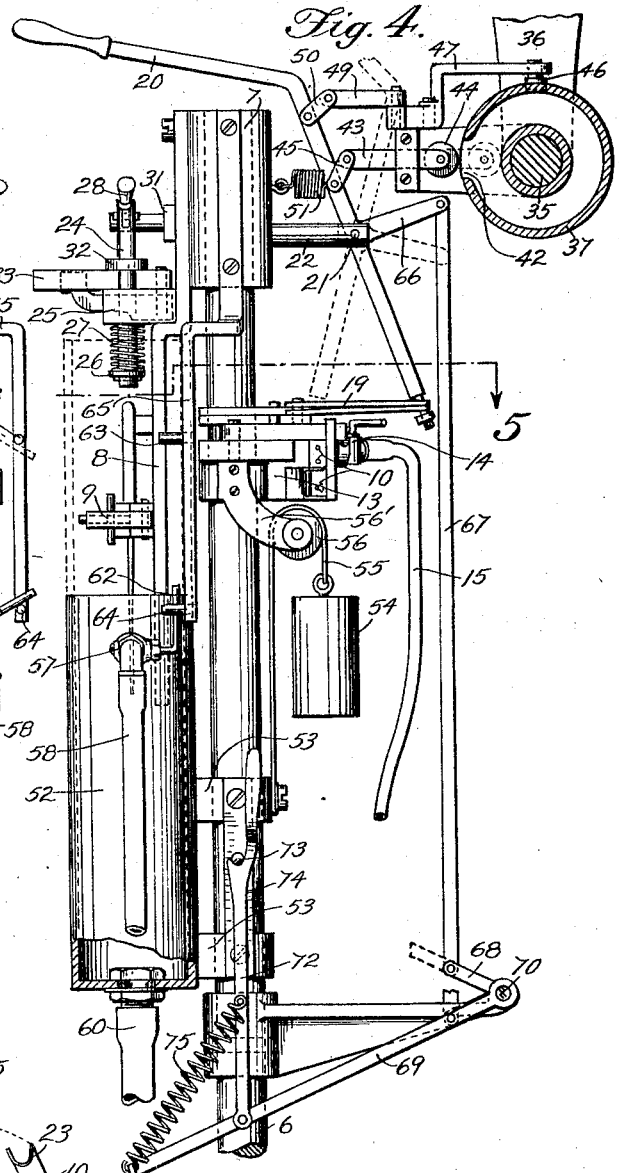
Figure 5:
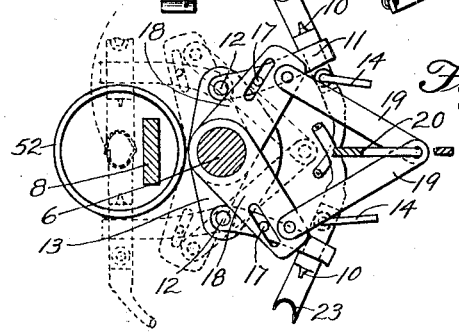

In the accompanying drawings, which form a part of this specification and in which like characters of reference indicate the same or like parts, Fig. 1 is a front elevation of a machine constructed in accordance with the invention; Fig. 2 is a detail view, partly sectional, of one of the clutch mechanisms used in the machine shown in Fig. 1; Figs. 3 and 4 are respectively front elevation and side elevation of one of the brazing units of the machine shown in Fig. 1, but on a larger scale and partly sectional; and Fig. 5 is a detail plan view taken on the line 5 in Fig. 4.

In carrying the invention into effect, there is provided mechanism for heating an assemblage of parts to be brazed together, and means for automatically incapacitating said mechanism after a predetermined heating interval, whereby successive assemblages will be uniformly treated. In the best constructions, said means is also operative to rehabilitate said mechanism, when manually actuated for this purpose; means for automatically cooling the brazed assemblages is provided; means for preventing the tarnishing of a highly-polished surface of the blades during the heating operation is provided; the heating means is movable in and out of operative position; the cooling means is also movable in and out of operative position; an automatically-operating timer is employed to incapacitate the heating mechanism at the proper time; and a plurality of brazing units operated by a single prime mover is employed. These mechanisms, means, and parts, may be widely varied in construction within the scope of the invention, for the particular machine selected to illustrate the invention is but one of many possible concrete embodiments of the same. The invention, therefore, is not to be restricted to the precise details of the structure shown and described.

Referring to the drawings, 6 indicates pillars upon which the various brazing units of the machine are mounted. These pillars may be supported in any suitable manner, as on a work bench, not shown. The brazing units are all alike, and for this reason a description of one will suffice for all.

When the machine is to be used for the purpose of brazing knife blades and handles, as in the machine shown, each pillar 6 carries at its top a sleeve 7 supporting a depending bar 8, and the latter carries a clamp 9 for engaging and supporting the bolster of the blade, as clearly shown in Figs. 1, 3 and 4. The blade has the usual tang inserted in the usual hole in the handle, with the brazing material. The clamped blade supports the handle in proper position for the brazing operation.

The mechanism for heating the assemblage of blade and handle, or other parts, to be brazed, is also carried by the pillars 6. This mechanism also includes two heaters between which the assemblage of parts is positioned during the brazing operation, and these heaters are movable in and out of operative position. With this end in view, the heaters include gas flame nozzles 10 mounted on swinging arms 11, pivoted at 12 to a yoke 13 fast on one of the pillars 6. Each nozzle 10 is provided with a cutoff valve 14, and is connected with a hose 15 which conducts gas to it from a common gas supply pipe 16.

The two heaters are shown in full lines in Fig. 5 as they lie in inoperative position. In the same figure their operative position is indicated by the dotted lines. They are moved into operative position by a manual operation and through the agency of the following parts. Each swinging arm 11 is provided with a stud 17 engaging a slot in an arm 18 which is swingable about a pillar 6 just above the yoke 13. Each arm 18 is pivotally connected with a link 19, and each link 19 is engaged by the lower end of a lever 20 which is fulcrumed at 21 to a post 22 projecting from and supported by the sleeve 7 before referred to. The lever 20 is bent over the top of the pillar 6, and when its free end is lifted, the links 19 act upon the arms 18 to swing the latter. By means of the stud and slot connections of these arms with the arms 11 carrying the heating nozzles, the latter are swung from their inoperative position, one on either side of the assemblage of parts to be brazed. The blade of a knife to be brazed in the machine is highly polished, and to prevent the flame of the heaters from tarnishing the highly polished surface of the same during the brazing operation, each heater carries a mask 23 which moves in and out of operative position with the nozzles 10. The two masks surround the parts to be brazed when in operative position, and the gas flame plays upon the handle just above them, at the one spot where the brazing occurs, but is kept away from the highly polished blade, thus avoiding the necessity for repolishing the same after the brazing operation.

To hold the assemblage of parts steady during the brazing operation, a plunger 24 is provided. This plunger reciprocates in a bearing 25 supported by the sleeve 7 before referred to. It has a collar 26 near its lower end, and between this collar and the bearing 25 a compression spring 27 is coiled around the plunger. The tendency of this spring is to force the plunger down on the top of the knife handle to steady the latter, as shown in the middle unit of Fig. 1. But when a blade and handle are to be introduced in the machine, or taken out thereof, this plunger is raised by means of a lever 28 engaging its upper end at 29, the lever being fulcrumed at 30 to a bar supported by the sleeve 7 before referred to. Above the bearing 25, the plunger 24 carries a collar 32, and when the plunger is raised to free it from a knife handle below, the under side of this collar is engaged by a spring-latch 33 fulcrumed on a pin 34 carried by the bearing 25. To cause the plunger to engage a knife handle below, the spring-latch is swung out of engagement with the collar 32, whereupon the spring 27 forces the plunger down into engagement with the handle, carrying the lever 28 with it.

In order that successive brazing operations may produce uniform results, means for incapacitating the heating mechanism after a predetermined heating interval is provided. This means coacts with the lever 20 which, it will be remembered, is manually operated to move the heating nozzles 10, 10 into operative position. It is automatic in its action however. The several brazing units of the machine are all connected by clutch mechanism with a common power shaft 35 journaled in suitable hangers 36 depending from the ceiling of the room in which the machine is operated, in a well known manner. Each unit is provided with a timer arranged to be intermittently driven by the power shaft 35. To this end, there is provided for each unit a timing-cam 37 which is loose on the shaft 35 and confined between one of the hangers 36 and a collar 38 pinned on the shaft. This timing-cam is connected by means of pins 39 with the loose member 40 of a clutch mechanism 40—41, of which 41 is the fast member pinned to the shaft. The timing-cam 37 has an annular wall provided with an opening 42 at one point on its perimeter. Working through this opening at the proper times is a bar 43 and a roller 44, the bar being connected with the lever 20 by means of a link 45. The loose clutch member 40 is provided with an annular groove around its perimeter, and in this groove rolls a shifting roller 46 carried by a bell-crank 47, supported by a bracket 48, which in turn is supported by the hanger 36 and which also supports the bar 43. The bell-crank 47 is connected with the lever 20 by means of links 49, 50.

When the lever 20 is actuated to move the heating nozzles into operative position, the bar 43 and roller 44 are moved through the opening 42 of the timing-cam 37. Simultaneously, the loose clutch member 40 is moved into engagement with the fast clutch member 41. As a result of these simultaneous movements, a predetermined heating interval is established and begun. It is terminated when the timing-cam has made one revolution, and the roller 44 is freed to pass out through the opening 42. A spring 51, connected with the sleeve 7 and with the lever 20, then pulls the roller out of engagement with the cam, shifts the clutch member 40 out of engagement with the clutch member 41, and moves the heating nozzles to inoperative position, simultaneously. Thus, by means of the mechanism so far described, the heating mechanism is automatically incapacitated after a predetermined heating interval; and at any time thereafter it may be manually rehabilitated, by actuation of the lever 20.

Means for automatically cooling the brazed assemblage of parts is provided, and as shown this means includes a movable water tank 52 supported by arms 53, 53, sliding on the pillar 6 before referred to. This tank is counterbalanced by means of a weight 54 and strap 55, the latter running over a pulley 56 suitably supported by a bracket 56' which in turn is supported by the yoke 13 before referred to. Connected with the upper part of the tank are two valves 57 controlling inflow of water to the tank. Connected with each of these valves is a hose 58 for conducting water from a common supply pipe 59 to the top of the tank. Connected with the bottom of the tank is a hose 60 which is also connected with a common drain pipe 61. When water is sprayed into the tank through the oppositely disposed valves 57, 57, it flows by gravity out through the hose 60. Each valve 57 is provided with an operating handle 62 which engages a stud 63 and opens the valve when the tank is moved upwardly, and which engages a stud 64 and closes the valve when the tank moves downwardly. The studs 63 and 64 are carried by depending bars 65 bolted to the sleeve 7 before referred to.

It is desirable that the tank be automatically moved upwardly as soon as the brazing operation in its unit is completed. To this end, the actuating lever 20 is provided with an arm 66 which is pivotally connected with the upper end of a link 67, the lower end of this link being pivotally connected with a short arm 68 of a bell-crank 68—69 fulcrumed at 70 to a bracket 71 carried by the pillar 6 before referred to. The long arm 69 of the bell-crank 68—69 is pivotally connected with a latch 72 engaging a stud 73 carried by a bar 74 connecting the two arms 53, 53 which support the tank 52. The latch 72 is normally kept in engagement with the stud 73 by the action of a spring 75 connected with the free end of the long arm 69 of the bell-crank 68—69 and with the latch 72. When the actuating lever 20 is itself actuated by the spring 51 at the end of a heating interval, it pulls the link 67 upwardly, and this in turn raises the tank over the hot assemblage of parts whereupon the valves 57 are opened and water is sprayed on said assemblage to cool it. At any time after the assemblage has been sufficiently cooled, the machine operator disengages the latch 72 from the stud 73 and permits the tank to drop back to its lowermost position, whereupon a brazed assemblage may be unclamped and removed from the machine and an unbrazed assemblage substituted therefor. After this is done, and the lever 20 is again actuated to start the operation of the unit, the latch 72 automatically reengages the stud 73 ready for tank operation at the end of the heating interval.

When the machine includes a series of brazing units, as shown, there is provided a prime mover, and means for independently connecting each of said units, or the incapacitating means thereof, with said prime mover. As shown and hereinbefore described, each unit is provided with means for intermittently connecting the same with the power shaft 35. This shaft carries a speed-changing mechanism consisting of three gears 75, 76 and 77 which are adapted for selective engagement with pinions 78, 79 and 80 respectively, the latter being fast on a slidable jack-shaft 81 supported by hangers 82 and 83 depending from the ceiling of the room in which the machine is installed. The jack-shaft 81 is shifted by means of a shifting lever 82' to selectively cause the pinions and gears to engage and drive the shaft 35. The jack-shaft 81 is rotated by means of a worm-wheel 83' splined on said shaft, and the worm-wheel 83' is rotated by double worm gearing 84 deriving its motion from a prime mover in the form of an electric motor 85 the speed of which is regulated by means of a rheostat 86.

In the left hand unit of Fig. 1, the tank 52 is shown in operative position for cooling a brazed assemblage of parts. In the middle unit in the same figure, an assemblage is shown in position to be operated upon; and in the right hand unit, the clamp is shown in position to receive an assemblage to be operated upon. In operating the machine, the operator places an assemblage of parts in position to be operated upon, starts that unit, and then goes to another unit and repeats the operation, taking out a brazed assemblage and inserting an unbrazed assemblage in one unit while the brazing operation is going on in the other units. The number of units to each machine thus depends upon the rapidity and ease with which the operator can replace brazed assemblages by unbrazed assemblages, and of course no skilled labor is required for this work, the essential functions of the machine units being performed and terminated automatically in each instance. In view of the foregoing description of the machine and of the operation of its units, a further detailed description of the machine as a whole is deemed to be unnecessary and is therefore omitted in the interest of brevity.

What is claimed is:

1. The combination with mechanism for heating an assemblage of parts to be brazed together, of means including a clutch-actuated timer and operative connections for automatically incapacitating said mechanism after a predetermined heating interval.

2. The combination with mechanism for heating an assemblage of parts to be brazed together, of means including a clutch-actuated timer and operative connections for automatically incapacitating said mechanism after a predetermined heating interval, said means being also operative to rehabilitate said mechanism.

3. The combination with mechanism for heating an assemblage of parts to be brazed together, of means including a clutch-actuated timer and operative connections for automatically incapacitating said mechanism after a predetermined heating interval, said means being also manually operative to rehabilitate said mechanism.

4. The combination with mechanism for heating an assemblage of parts to be brazed together, of means including a clutch-actuated timer and operative connections for automatically incapacitating said mechanism after a predetermined heating interval, and means for automatically cooling the brazed assemblage.

5. The combination with mechanism for heating an assemblage of parts to be brazed together, of means including a clutch-actuated timer and operative connections for automatically incapacitating said mechanism after a predetermined heating interval, and means actuated by said incapacitating means for automatically cooling the brazed assemblage.

6. The combination with mechanism for heating an assemblage of parts to be brazed together, of means including a clutch-actuated timer and operative connections for automatically incapacitating said mechanism after a predetermined heating interval, said mechanism including two heaters between which said assemblage is positioned.

7. The combination with mechanism for heating an assemblage of parts to be brazed together, of means for automatically incapacitating said mechanism after a predetermined heating interval, said mechanism including two heaters between which said assemblage is positioned, and means for preventing said heaters from tarnishing said assemblage.

8. The combination with mechanism for heating an assemblage of parts to be brazed together, of means for automatically incapacitating said mechanism after a predetermined heating interval, said mechanism including two heaters between which said assemblage is positioned, and a mask between said heaters and said assemblage for preventing said heaters from tarnishing said assemblage.

9. The combination with mechanism for heating an assemblage of parts to be brazed together, of means including a clutch-actuated timer and operative connections for automatically incapacitating said mechanism after a predetermined heating interval, said mechanism including two heaters between which said assemblage is positioned, and means for supporting said heaters to permit them to be moved in and out of operative position.

10. The combination with mechanism for heating an assemblage of parts to be brazed together, of means for automatically incapacitating said mechanism after a predetermined heating interval, said mechanism including two heaters between which said assemblage is positioned, and swinging arms carrying said heaters.

11. The combination with mechanism for heating an assemblage of parts to be brazed together, of means including a clutch-actuated timer and operative connections for automatically incapacitating said mechanism after a predetermined heating interval, said mechanism including two heaters, means for supporting said heaters to permit them to be moved in and out of operative position, and means for supporting said assemblage between said heaters.

12. The combination with mechanism for heating an assemblage of parts to be brazed together, of means including a clutch-actuated timer and operative connections for automatically incapacitating said mechanism after a predetermined heating interval, said mechanism including two heaters, means for supporting said heaters to permit them to be moved in and out of operative position, and a clamping device for stationarily supporting said assemblage between said heaters.

13. The combination with mechanism for heating an assemblage of parts to be brazed together, of means for automatically incapacitating said mechanism after a predetermined heating interval, said means including a clutch-actuated timer, and operating connections between said timer and said mechanism.

14. The combination with mechanism for heating an assemblage of parts to be brazed together, of means for automatically incapacitating said mechanism after a predetermined heating interval, said means including a clutch, and operating connections between said clutch and said mechanism.

15. The combination with mechanism for heating an assemblage of parts to be brazed together, of means for automatically incapacitating said mechanism after a predetermined heating interval, said means including a clutch, and a timer and operating connections between said clutch and said timer and said mechanism.

16. The combination with mechanism for heating an assemblage of parts to be brazed together, of means for automatically incapacitating said mechanism after a predetermined heating interval, said means including an actuating lever, a rotary timer having a circular pathway open at one point, a bar connected with said lever and carrying a roller movable in and out of said pathway.

17. The combination with mechanism for heating an assemblage of parts to be brazed together, of means for automatically incapacitating said mechanism after a predetermined heating interval, said means including an actuating lever, a spring operative to move said lever, and means for holding said spring inactive for a predetermined interval.

18. The combination with mechanism for heating an assemblage of parts to be brazed together, of means for automatically incapacitating said mechanism after a predetermined heating interval, said means including a clutch-actuated timer and operative connections including a lever, and a toggle mechanism connecting said lever with said heating mechanism.

19. The combination with mechanism for heating an assemblage of parts to be brazed together, of means for automatically incapacitating said mechanism after a predetermined heating interval, said means including an actuating lever, a toggle mechanism connecting said lever with said heating mechanism, a spring for moving said lever, and a timer for holding said spring inactive for a predetermined interval.

20. The combination with mechanism for heating an assemblage of parts to be brazed together, of means for automatically incapacitating said mechanism after a predetermined heating interval, and means for automatically cooling the brazed assemblage, said cooling means including a water tank which is movable in and out of operative position.

21. The combination with mechanism for heating an assemblage of parts to be brazed together, of means for automatically incapacitating said mechanism after a predetermined heating interval, and means for automatically cooling the brazed assemblage, said cooling means including a movable water tank actuated by said incapacitating means.

22. The combination with mechanism for heating an assemblage of parts to be brazed together, of means for automatically incapacitating said mechanism after a predetermined heating interval, and means for automatically cooling the brazed assemblage, said cooling means including a movable water tank provided with intake valves operated by the movement of said tank.

23. The combination with mechanism for heating an assemblage of parts to be brazed together, of means for automatically incapacitating said mechanism after a predetermined heating interval, and means for automatically cooling the brazed assemblage, said cooling means including a movable water tank, and connections between said tank and said incapacitating means for moving said tank into operative position as said incapacitating means acts.

24. The combination with mechanism for heating an assemblage of parts to be brazed together, of means for automatically incapacitating said mechanism after a predetermined heating interval, and means for automatically cooling the brazed assemblage, said cooling means including a movable water tank, and connections between said tank and said incapacitating means for moving said tank into operative position as said incapacitating means acts, said connections including a trip latch for permitting movement of said tank out of operative position without disturbing said incapacitating means.

25. The combination with mechanism for heating an assemblage of parts to be brazed together, of means for automatically incapacitating said mechanism after a predetermined heating interval, and means for automatically cooling the brazed assemblage, said cooling means including a movable water tank actuated by said incapacitating means, and means for counterbalancing said tank to relieve the load on said incapacitating means.

26. The combination with a series of mechanisms for heating assemblages of parts to be brazed together, of a series of means including a clutch-actuated timer and operative connections for automatically incapacitating said mechanisms after predetermined intervals, a prime mover, and means for independently connecting each of said incapacitating means with said prime mover.

27. The combination with a series of mechanisms for heating assemblages of parts to be brazed together, of a series of means including a clutch-actuated timer and operative connections for automatically incapacitating said mechanisms after predetermined intervals, a prime mover, means for independently connecting each of said incapacitating means with said prime mover, and speed-changing mechanism between said prime mover and said connecting means.

In testimony whereof, I have signed my name to this specification.

THOMAS C. SHEEHAN.